United States Patent Office 2,729,618
Patented Jan. 3, 1956

2,729,618
ISOCYANATE-MODIFIED POLYESTERS REACTED WITH GLYCOLS

Karl Erwin Müller, Leverkusen-Bayerwerk, Friedrich Wilhelm Schmidt, Leverkusen-Wiesdorf, Erwin Weinbrenner, Leverkusen-Bayerwerk, Germany, and Hans-Frank Piepenbrink, deceased, late of Leverkusen-Wiesdorf, Germany, by Ursula B. Piepenbrink, administratrix, Leverkusen-Wiesdorf, Germany, assignors to Farbenfabriken Bayer Aktiengesellschaft, Leverkusen, Germany, a corporation of Germany No Drawing. Application November 18, 1952,
Serial No. 321,272

18 Claims. (Cl. 260—75)

Our present invention relates to a new type of high molecular products which exhibit certain rubber-like properties and to a method for preparing such products. This application is a continuation-in-part of our prior copending application, Serial No. 70,598, filed January 12, 1949 (now abandoned).

In accordance with the state of the art dicarboxylic acids and glycols can be converted by condensation into linear polyesters the molecular weight of which normally does not exceed 5000. These polyesters represent either wax-like and low melting or highly viscous products which as such are not useful as plastics. It is only in exceptional cases, e. g. in the case of polyesters from sebacic acid and ethylene glycol that with the application of special methods of condensation high molecular weight polymers can be prepared which are capable of being spun from the melt and yield threads of a satisfactory degree of strength. On the other hand, these products are characterized by a low melting point which, as a rule, is below 100° C. whereby their practical application is at least strongly handicapped. Many attempts have been made to convert such products into high molecular weight polyesters in order to render them useful for all such applications to which related linear poly-condensation products are normally put. As far as we know, the first promising results in this direction have been achieved by causing polyesters of the character described to react with diisocyanates. We refer in this connection to French Patent 869,243 according to which high molecular, heat moldable products are obtained by causing diisocyanates and polyesters to react with each other in equivalent amounts. The reaction occurring between these products is due to the fact that the polyesters contain either hydroxyl or carboxyl end groups which react with the diisocyanate group while forming urethane or carbonamide groups, carbon dioxide being set free in the latter case. In accordance with German application J 77,229, filed April 13, 1944, which was based on an invention made by several of us, the diisocyanates were used in excess over that amount which is necessary for reacting with the hydroxylic and carboxylic end groups of the polyesters. In this manner there were obtained high molecular products which besides valuable other qualities exhibit certain properties which are characteristic of rubber-like products. For this process there can be used various aliphatic and aromatic diisocyanates. As aliphatic isocyanates there should be mentioned: tetramethylene diisocyanate, pentamethylene diisocyanate, hexamethylene diisocyanate and thiodipropyl diisocyanate. Of the aromatic series there may be mentioned the diisocyanates of the benzene series, e. g. phenylene diisocyanate, chlorophenylene diisocyanate, toluylene diisocyanate and naphthylene diisocyanates. It is to be understood, however, that this rubberiness is restricted to the "vulcanized" state and not to the intermediate stages of condensation so that these products cannot serve as substitute for rubber but constitute a new type of synthetic thermosetting highly polymeric products. One of the characteristic differences between natural rubber and synthetic rubber-like materials on the one hand and "diisocyanate modified polyesters" on the other hand resides in the fact that in the case of the latter the curing process starts from viscous or easily fusible products, "vulcanization" proceeding through all intermediate stages between the viscous and the "vulcanized" character, whereas rubber and rubber-like materials in the uncured state exhibit at the most certain thermoplastic properties. It follows therefrom that "diisocyanate modified polymers" allow, in addition to the usual rubber processing, other working and molding processes such as casting the reactive mix into a mold. In the German application mentioned above there were used as diisocyanates i. a. those of condensed aromatic nuclei such as naphthalene-1.5-diisocyanate, which proved to be particularly suitable. In the German application J 77,781 filed July 7, 1944, which was likewise based on an invention made by several of us, it has been emphasized that the cross-linking which is decisive for rubber-like properties is due to a series of complicated reactions which are supposed to proceed as follows: the interaction of polyesters and an excess of diisocyanates over the amount which is equivalent to the polyester end groups results in a chain-lengthening, the units thus formed having isocyanate end groups. These terminal isocyanate groups react with water which results in a further union of two isocyanate groups by a urea linkage. In this manner a high molecular weight product is obtained. In the urea linkages the NH-groups are capable of interacting with further isocyanate groups thus giving rise to the formation of cross linkages and, in consequence thereof, of properties resembling those of natural or synthetic rubber in the vulcanized state. Only a small amount of water of about 0.2% is required to bring about this reaction. The water can be introduced by dropping into, or by blowing steam onto the surface of the mix or, finally, by incorporating within the mix a salt which contains crystal water. The cured products obtained exhibit extraordinarily good properties the most promising of which are tear resistance, ageing resistance, abrasion loss, fastness to ozone, and solvent resistance. These subjects have been published in Bios Final Report No. 1166 "Synthetic Rubber" Interrogation of Dr. Bayer and Dr. Roelig of I. G. Farbenindustrie Aktiengesellschaft, Leverkusen, in UK. on 1st and 2nd August 1946.

Products of the character described though distinguished by excellent mechanical properties suffer from certain disadvantages chief among which consists in the use of water as curing agent. Reaction of isocyanates with water to form ureas is accompanied by the splitting off of carbon dioxide which forms bubbles in the mix. The bubbles must be prevented either by allowing the carbon dioxide to escape or by the application of pressure thus keeping the carbon dioxide dissolved in the mix. Formation of bubbles could not be prevented, however, in the case of all such processing operations wherein pressure cannot be applied and the carbon dioxide has no chance to escape. This is true, for instance, of the casting process referred to above. This is the more embarrassing as the casting method involves a considerable saving of time and expense when compared with the usual rubber processing and molding.

It is the object of our present invention to do away with these disadvantages and to build up a "diisocyanate modified polyester" which can be satisfactorily worked and molded according to all methods which are adapted to the various intermediate stages of condensation, including the casting. Other objects of our invention will be apparent from the following specification and claims:

Our invention primarily consists in the use as curing agent for "diisocyanate modified polyesters" of glycols. The curing effect which is brought about by glycols might be due to the fact that part of the isocyanate end groups are tied together in the following manner:

Polyester.NCO+HO.R.OH+NCO.polyester→
polyester.NH.COO.R.OOC.NH.polyester whereas the remaining part of the isocyanate end groups might react with the NH-groups, thus formed with crosslinking. We wish to emphasize, however, that the course of reaction has not been cleared up as yet. It is the more obscure as in general the hydrogen of urethane groups is not capable of reacting with isocyanates, at least under the conditions to be applied here and as the "diisocyanate modified polyester" likewise contains urethane groups without showing any remarkable tendency of cross-linking.

At any rate, the use of glycols results in a curing process which is free from the disadvantage of bubble formation so that in accordance with the present invention "diisocyanate modified polyesters" can be worked, molded and cured according to every process which is adapted to the respective state of condensation. Besides that, our new process is superior to the prior known water process in that it renders possible the modifying of the cured product by a suitable choice of glycol within very wide limits, in the first line as to the degree of softness. This will be explained in detail in the following description and examples.

The linear polyesters which are primary starting materials for our present invention are preferably made from saturated aliphatic products, at least for the most part. As acids there will be mentioned: malonic acid, succinic acid, adipic acid, methyladipic acid, maleic acid, carbonic acid, dihydromuconic acid, thiodipropionic acid, diethyl-ether-dicarboxylic acid, sebacic acid, suberic acid, and higher dicarboxylic acids. As glycols there may be mentioned: ethylene glycol, 1.2-propylene glycol, 1.3-propylene glycol, 1.3-butylene glycol, 1.4-butylene glycol, 1.6-hexane diol, methyl hexane-1.6-diol, 1.4-butene diol, diethylene glycol, thiodiglycol, 2.2'-dimethyl-1.3-propylene glycol. Hydroxy carboxylic acid can also be used in the preparation of poly-esters, provided however, that the tendency thereof of polycondensation is stronger than the tendency of ring formation and that sufficient glycols are present to secure formation of hydroxyl end groups. Moreover, mixtures of various acids and glycols can be used, mixed polyesters being obtained thereby. Other bifunctional reactants which are complementary to the acids and glycols can be used in smaller proportions. As examples there are mentioned compounds containing aromatic nuclei, such as phthalic acid or terephthalic acid, aromatic or aliphatic diamines, for instance, phenylene diamines, naphthylene diamines, piperazine ethylene diamine as well as amino alcohols, for instance, amino propanol and hydroxyethylaniline. Polycondensation of the reactants is effected by heating to 100–250° C. Care must be taken that, owing to a slight excess of glycols and to sufficiently long heating, the polyester has practically no acid value. The OH-value must be between about 20 and about 80, preferably between 40 and 60. That corresponds to a percentage of OH-groups of 0.6–2.4, preferably 1.2–1.8 by weight. Prior to the reaction with diisocyanates the polyesters thus obtained must be freed from water by heating to 100–150° C. in the vacuum or by introducing inert gases at the same temperature. Among the acids preference is given to adipic acid, and among the glycols to ethylene glycol and 1.2-propylene glycol.

For converting the polyesters into the diisocyanate modification products thereof care must be taken that the diisocyanates are used in excess over the OH groups. The excess must be within the limits of 20–250% preferably 50–100%, over the amount which is necessary for combining with the OH-groups. Owing to the reaction which occurs in this step the OH end groups of the polyesters are converted into NCO end groups. Moreover, depending on the excess of diisocyanate several polyester units can be linked together. In the case of a smaller excess up to 3 units may be linked whereas in the case of a larger excess no chain lengthening occurs at all. In case the diisocyanate excess is more than 100% there will even remain some free diisocyanate in the mix. Aromatic diisocyanates are preferred and among them those of the polycyclic series as they have a certain "spaciousness," confer some rigidity to the structure and cause separation of the adjacent chains. In the first lines, naphthylene-1.5-diisocyanate is to be mentioned. Furthermore, the other naphthylene diisocyanates can also be used as well as diisocyanates of the diphenyl series, for instance, 3.3'-dichlorodiphenyl-4.4'-diisocyanate, and the diisocyanates of the pyrene, fluorene and chrysene series. Reaction of the polyester with the diisocyanate is performed at temperatures of from 80 to 150° C. in the absence of moisture. With the evolution of heat, there occurs a slight increase of viscosity. Materials thus obtained can be stored unchanged for a prolonged period of time. Owing to the high reactivity of the NCO end group, it is preferred, however, to proceed with the following steps without delay.

In the next step, the "diisocyanate modified polyester" thus formed is caused to react with a compound of the general formula R(OH)₂ having a molecular weight not exceeding 800, wherein R is a radical selected from the group consisting of a divalent hydrocarbon radical and a divalent radical in which the carbon chain is interrupted by a member of the group consisting of —O—, —N—, —S—, —SO₂ in such a proportion that the excess of NCO groups is reduced to at the most zero. It is preferred, however, that said compounds are used in somewhat less than the stoichiometric proportion but no less than 25 p. c. thereof. In this step, the same glycols can be used as in the case of preparing polyesters. We wish to state, however, that in this case less valuable products will be obtained from ethylene glycol in comparison with its higher homologues, e. g. 1.4-butanediol or the corresponding unsaturated derivatives such as butenediol or butinediol. Especially suitable are also cyclic glycols such as quinitol or hexahydropyrocatechol. As further glycols there may be mentioned: α-monochlorohydrin, glycerine-α-alkyl ether or glycerine-α-aryl ether, xylylene glycols, or the Diels-Alder addition product of butenediol and anthracene. Suitable compounds of the general formula R(OH)₂ are further sulfo-dibutyric acid dihexanol ester, adipic acid dihexanediol ester, adipic acid dibutanol amide, ethylene-β-hydroxyethyl-urethane, glycol ester of the phthalic acid having two OH-groups in the molecule. It was found that aliphatic glycols will yield softer products whereas the use of cyclic glycols, especially those with aromatic rings, results in harder materials. Reactivity of the glycols also varies within a wide scope.

It is an important feature of our invention that reactivity of the diisocyanates with the polyester as well as with the glycols of the formula R(OH)₂, which are used in the last step, can be influenced by various means thus adapting the reaction velocity to the processing method desired. Three different methods for accelerating or retarding the reaction velocity are described:

(a) A remarkable delay in the reactivity of the isocyanate groups can be achieved by using acid reacting agents which are added to the polyester prior to reaction with the diisocyanates. In the first line, there may be mentioned hydrogen chloride which can be used either in the gaseous state or in form of liquid hydrochloric acid. Sulfur dioxide, boric acid, and also unreacted organic acids which may have remained in the polyester from its production or may be added thereto at a later stage, have a similar effect. Those products also proved successful which decompose into acids only upon heating, e. g. butadiene sulfone (which decomposes into butadiene and sulfur dioxide). Besides, a delaying effect is reached by fillers of an acid character, e. g. activated charcoal, which was prepared in an acid medium.

(b) An essential acceleration of the curing reaction is achieved by adding tertiary organic bases to the mix subsequent to or together with the incorporation of the compounds of the general formula $R(OH)_2$. The accelerating effect of pyridine on the isocyanate reaction is known. We have found that a stronger effect is achieved by using basic catalysts such as hexahydrodimethylaniline, methyl-piperidine, dimethylpiperazine, tribenzylamine or tetramethyl-diaminodipropylether. These catalysts are preferably used in quantities of 0.5 to 0.01% of the mix. Similar effects are achieved by using polyesters containing basic reacting groups in chemical combination.

(c) We have further found that the technically prepared polyesters often vary considerably as to their reactivity towards diisocyanates. This phenomenon might be due to impurities having a catalytic effect or to unchanged glycols which adhere to the polyester. These anomalies, however, can easily be avoided by washing the polyester with water or with an immiscible organic solvent, or by blowing an inert gas through the melt at a raised temperature for a prolonged period of time.

In some cases, especially on casting, it is often desirable to combine these various regulating factors, for instance, in such a way that interaction of the polyester with the diisocyanate is retarded by acids so as to obtain a stable mix and, later on, the curing is accelerated by adding basic catalysts. In this manner, the reaction velocity can be well adapted to the various processing methods.

Dyestuffs, softeners and fillers can be added to the mixes during all processing steps without any difficulties. As suitable softeners there may be mentioned phthalic acid esters and aromatic sulfonamides. Sulfur containing softeners are particularly suitable, e. g. methyl-bis-thioglycolic acid butyl ester. Like in the case of natural rubber part of the fillers give rise to improved mechanical properties of the cured products. This is true, for instance, of titanium dioxide and, particularly, of carbon black which, in an amount of 5–15% by volume considerably improves the tear resistance of the material. These fillers are worked either into the polyester or into its diisocyanate modification products. On processing tough mixes of an advanced state of condensation the addition can also be performed on the roller.

In the following, several characteristic processing methods for our new products will be described:

(A) *Press molding.*—The "diisocyanate modified polyester" is caused to react with the glycol of the general formula $R(OH)_2$ at a temperature of 100–150° C. and, while strongly working through, condensation is carried out until the mix which, in the beginning, becomes more and more viscous is at last converted into a crumbly or tough material. For this processing mechanical kneading machines are preferably used, for instance, the apparatus according to Werner and Pfleiderer. On the roller the crumbly material can easily be made into a sheet which, at a temperature between 120–170° C., can be pressed into plates or molded articles of any kind.

(B) *Casting.*—The molten "diisocyanate modified polyester" is caused to react with an appropriate amount of glycol of the general formula $R(OH)_2$, that mixture is briefly and thoroughly mixed and is cast into the mold desired in the hot state, before condensation is completed. Mixing may preferably be performed in screw conveyers. For securing easy removal of the molded article from the mold the latter is provided with a protective coating. Such a protective coating may consist, for instance, of wax-like materials or also of silicone or inert water-soluble films such as water-soluble cellulose derivatives. The reaction mixture remains in the mold until it is solidified. For that purpose, the molds are preferably heated to temperatures of from 60 to 150° C. By after-heating outside the mold, the articles thus obtained can often be improved as to their mechanical values. A special casting process is the centrifugal casting, according to which the still liquid condensation product is cast into rotating molds wherein it remains until it is solidified while the molds are continuously rotating. Tires for cycles can be prepared in this way in a flat structure as well as in a mold representing the final shape of the tire with or without fabric. Casting can also be performed at rotating figures below the usual speed of centrifuges, for instance at 200 R. P. M. On preparing tires the condensation product is either cast onto textile or metal nettings or the latter are worked into the cast tread. In this way, for instance, tires for cycles can be prepared in a completely new way. The mechanical properties of the cured product are such as to allow one to prepare excellent tires even without fabric, the tires thus made being, moreover, distinguished by a very low rolling resistance. Besides, the liquid intermediate state of condensation may be used for the lining or imbedding of textiles or metal cord. This process offers prospects for perfectly new methods of preparing elastic articles, all the more so, as adhesion of these articles to all kind of material is generally extraordinarily good. It has proved to be successful in many cases to combine the casting process and the press molding process, for instance, in such a manner that the castings are removed from the mold before the reaction is completed and are then pressed into the final shape. Of course, this casting process also allows one to prepare sheets on a suitable surface. In this case, it is sometimes of advantage, to dilute the batch by adding inert solvents, such as chlorohydrocarbons, esters, or aromatic hydrocarbons. On heating the sheets the solvent is evaporated. Also dipped articles can be prepared from such solutions.

(C) *Extruding and calendering.*—For this processing method it is necessary to carry out condensation of the "diisocyanate modified polyester" with the chain-lengthened glycol of the formula $R(OH)_2$ up to an intermediate state which is between that used for the casting on the one hand and for press molding on the other hand. This condition is achieved by a combination of the following steps: for preventing sticking several per cent of hard paraffin or fatty acid derivatives are added to the mix. The temperature is to be kept low. Addition of fillers, for instance, carbon black, titanium dioxide or silicious chalk, improves the workability of the material. On observing these conditions an easily moldable material will be obtained which, preferably at temperatures between 40–100° C., can be extruded in an ordinary extruding machine to form threads, belts or tubes. Sheets can also be obtained on the calendar according to this process. For completing the reaction these molded products are after-heated as usual, preferably after storing for some time. As especially valuable properties of the sheets and tubes thus obtained their excellent tear resistance and gas impermeability shall be emphasized. Many of the products thus prepared also exhibit a low swelling property in organic solvents.

(D) *Reclaiming.*—The cured products obtained according to the processes (A)–(C) or scrap material can be reclaimed in a simple manner. The scrap material can easily be made again into a moldable sheet on the roller. Sheet formation and, especially, the subsequent remolding are facilitated if plasticizers, e. g. unmodified polyester or also "diisocyanate modified polyester" are added. In this way, molded articles will be prepared which still exhibit about 70–80 per cent of the mechanical properties of the original material.

Another method of reclaiming consists in heating ground scrap material with steam and blending the stock thus obtained either with freshly condensed material or with some fresh diisocyanate and subsequently pressing while heating. Products prepared from material thus reclaimed are easily moldable and their quality is almost as good as that of products prepared from freshly condensed material.

Our invention is furthermore illustrated by the following examples without, however, being restricted thereto, the parts being by weight if not otherwise stated:

Example 1

1000 parts of glycol adipic acid polyester of the OH-value 50 (corresponding to 1.5 per cent OH) are dehydrated in a stirring vessel at a temperature of 130° C. and under a pressure of 12 mm. The polyester is free from water as soon as formation of bubbles has stopped. While stirring 160 parts of 1.5-naphthylene diisocyanate are added at 130° C., a rise of temperature to 142° C. being observed thereby. As soon as temperature drops 25 parts of finely powdered quinite are stirred into the mix. After a few minutes the mix becomes more and more viscous and, at last, viscosity increases to such an extent that 20 minutes later the stirrer is stopped owing to the material having been converted into a crumbly mass. On the roller the condensation product may be made into a sheet and upon press molding at 150° C. for 20 minutes the following figures are obtained:

| | |
|---|---|
| Tensile strength _____kg./cm.$^2$__ | 384 |
| Elongation at break _____percent__ | 600 |
| Permanent set _____do____ | 3 |
| Tear resistance _____kg./cm.$^2$__ | 175 |
| Load at 300% elongation _____ | 60 |
| Hardness _____ | 67 |
| Resiliency _____ | 59 |

If 300 parts of carbon black are added to the polyester there are obtained products which exhibit the following properties provided that the other conditions and proportions of ingredients are the same as above:

| | |
|---|---|
| Tensile strength _____kg./cm.$^2$__ | 321 |
| Elongation at break _____percent__ | 478 |
| Permanent set _____do____ | 12 |
| Tear resistance _____kg./cm.$^2$__ | 240 |
| Load at 300% elongation _____ | 109 |
| Hardness _____ | 80 |
| Resiliency _____ | 52 |

In this manner there can be made sheets of a thickness between 0.5 and several centimeters and, moreover, various molded articles such as heels, soles, packings, buffers for cars, sandals, bottle rings, balls, e. g. golfballs and hockey balls, bandages, bicycle handles, foot rests, etc.

1.5-naphthylene diisocyanate can be substituted by isomeric 1.4- or 2.7-naphthylene diisocyanates.

Example 2

A kneader of two litres capacity which has been heated up to 120° C. is charged with 1000 parts of glycol adipic acid polyester dehydrated in the vacuum at 130° C. and 160 parts of 1.5-naphthylene diisocyanate are added. After about 10 to 15 minutes 22 parts of thiodiethylene glycol are added to the mix. Whereas before the addition of thiodiethylene glycol viscosity of the mix had scarcely changed, a great increase is now effected after a short time and, about 20 to 30 minutes later, there is obtained a crumbly material which drops from the paddles of the kneader and can be made into a sheet. Press molding is performed at 150° C. and the following figures are obtained:

| | |
|---|---|
| Tensile strength _____kg./cm.$^2$__ | 239.7 |
| Elongation at break _____percent__ | 545 |
| Permanent set _____do____ | 3 |
| Tear resistance _____kg./cm.$^2$__ | 125 |
| Load at 300% elongation _____ | 34 |
| Hardness _____ | 62 |
| Resiliency _____ | 69 |

On using 20 parts of 1.4-butine diol $$(OH.CH_2.{\equiv}C.CH_2OH)$$

the following properties are obtained provided that the other proportions of ingredients are the same as above:

| | |
|---|---|
| Tensile strength _____kg./cm.$^2$__ | 320 |
| Elongation at break _____percent__ | 640 |
| Permanent set _____do____ | 6 |
| Tear resistance _____kg./cm.$^2$__ | 158 |
| Load at 300% elongation _____ | 35 |
| Hardness _____ | 60 |
| Resiliency _____ | 70 |

The material thus obtained is suitable for conveyor belts.

Example 3

1000 parts of propylene glycol-1.2-adipic acid polyester are dehydrated at 130° C. and 12 mm. pressure and are caused to react with 160 parts of 1.5-naphthylene diisocyanate. After completion of reaction 30 parts of triethylene glycol are added to the mix at 130 to 135° C. Increase of viscosity is somewhat less than in the case of quinite. The soft material obtained after rolling and press molding exhibits the following properties:

| | |
|---|---|
| Tensile strength _____kg./cm.$^2$__ | 158 |
| Elongation at break _____percent__ | 925 |
| Permanent set _____do____ | 12 |
| Tear resistance _____kg./cm.$^2$__ | 37.5 |
| Load at 300% elongation _____ | 22 |
| Hardness _____ | 68 |
| Resiliency _____ | 41 |

On applying the above material on cotton textiles (polyurethane fabrics) coatings for collapsible boats are obtained which are distinguished by an excellent tensile strength and, above all, by a good resistance to ageing.

Example 4

500 parts of a technical glycol adipic acid polyester of the OH-value 58 (corresponding to 1.75 per cent OH) and of the acid value 1 which, after condensation, was blown with air at 130° C. for half an hour, are carefully dehydrated at the same temperature and in a vacuum of 12 mm. As soon as dehydration is completed, which takes about one hour, 80 parts of 1.5-naphthylene diisocyanate are added that giving rise to an increase of temperature of 5 to 8° C. After completion of reaction 10 parts of 1.4-butinediol are added at 130° C. and, after shortly stirring, the hot mix is cast into the mold. The mold is afterheated in a drying chamber at 100° C. whereby the mix becomes rubber-like after about half an hour. After further heating for 5 to 6 hours reaction is completed and a material with rubber-elastic properties is obtained. A test resulted in the following figures:

| | |
|---|---|
| Tensile strength_____ kg./cm.$^2$ | 281 |
| Elongation at break_____ per cent | 720 |
| Permanent set_____do__ | 7 |
| Tear resistance_____ kg./cm.$^2$ | 100 |
| Resiliency _____ | 60 |
| Hardness _____ | 73 |
| Stitch tear test_____ | 86 |

As moldings there may be mentioned: plates, pipes, cylinders, rings, boots or parts of boots, balls, elastic structural parts for machines, coverings for ball mills and classifying apparatus.

The good abrasion is illustrated by the following test: two iron drums of 250 mm. length and 200 mm. diameter each one of which is lined with a 2 mm. thick covering of the above material were filled each with 2000 grams of quartz pieces and rolled for 75 hours. After that time the iron drum with the above lining had lost 2 grams of its weight by abrasion whereas the drum not lined had lost 12 grams. The powdered quartz obtained in the iron drum lined with the above material had a white color whereas the powdered quartz in the other drum was grey owing to the iron dust abraded by the rolling.

Example 5

1000 parts of a glycol adipic acid polyester blown by air of the OH-value 52 (corresponding to 1.58 per cent OH) and of the acid value 0.8 are dehydrated after the addition of 50 parts of carbon black as described in the foregoing examples and caused to react with 160 parts of 1.5-naphthylene diisocyanate at 130° C. After about 10 minutes, as soon as temperature drops, 25 parts of quinite are added and, after shortly stirring, the mix is cast into a rotating drum heated up to 100° C. into the inside surface of which the profile of a bicycle tire has been cut. The casting mold may either be flat or hollow-shaped with a metal core so that tires will be obtained which represent the final shape. Flat-cast tires are shaped before afterheating on a straining tube or metal core. After about 20 minutes the content of the drum has solidified and, after further 40 minutes, the tire can be taken out at 100° C., the tire being then after-heated in a drying chamber for 5 to 6 hours at the same temperature. Depending on the quantities of ingredients and the shape of the drum, tires of different sizes may be prepared, the following properties being obtained thereby:

| | | |
|---|---|---|
| Tensile strength | kg./cm.$^2$ | 384 |
| Elongation at break | per cent | 600 |
| Permanent set | do | 3 |
| Tear resistance | kg./cm.$^2$ | 175 |
| Resiliency | | 59 |
| Load at 300% elongation | | 45 |
| Hardness | | 67 |
| Stitch tear test | | 95 |

If glycol adipic acid polyester is substituted by a polyester mix composed of 700 parts of glycol adipic acid polyester and 300 parts of propylene glycol 1.2-adipic acid polyester the following properties are obtained:

| | | |
|---|---|---|
| Tensile strength | kg./cm.$^2$ | 235 |
| Elongation at break | per cent | 570 |
| Permanent set | do | 14 |
| Tear resistance | kg./cm.$^2$ | 117 |
| Resiliency | | 47 |
| Load at 300% elongation | | 54 |
| Hardness | | 76 |
| Stitch tear test | | 108 |

Example 6

1000 parts of glycol adipic acid polyester of the OH-value 52 (corresponding to 1.58 per cent OH) and of the acid value 0.8 are mixed prior to dehydration with 10 drops of concentrated hydrochloric acid and, thereafter, dehydrated as described above. After reaction with 160 parts of 1.5-naphthyl diisocyanate 25 parts of quinite are added and the mix is well stirred. Then, 1.5 parts by volume of hexahydroximethyl aniline are added while stirring and the mix is cast into the drum described above. Almost 15 to 20 minutes later the tire can be removed from the mold and cured by afterheating at 100° C. for 5 to 6 hours.

Example 7

1000 parts of glycol adipic acid polyester of the OH-value 52 (corresponding to 1.58 per cent OH) and of the acid value 0.8 which has been dried in the vacuum at 130° C. are caused to react with 210 parts of nitrobenzidine diisocyanate while stirring. After completion of reaction 25 parts of quinite are stirred into the mix at 130° C. which is then cast into the mold. By afterheating at 100° C. for 24 hours rubber-like products with good mechanical properties are obtained.

Example 8

1000 parts of glycol adipic acid polyester dehydrated as described above with a hydroxyl content of 1.5 per cent are caused to react with 232 parts of o-dichlorobenzidine diisocyanate at 130° C. Temperature drops to 118 to 120° C. and is raised again to 130° C. As soon as reaction between the polyester and the diisocyanate starts a rise of temperature to 148 to 150° C. is to be observed. While stirring it is cooled down to 140° C. and the mix is divided into three portions of 300 parts each.

At 140° C. 7.5 parts of quinite are stirred into the first mix, 6 parts of 1.4-butylene glycol into the second mix and 5.8 parts of butene diol into the third mix and all mixes are immediately cast into molds. By afterheating at 100° C. for 24 hours rubber-like products with good properties are obtained.

Example 9

1000 parts of a carefully dehydrated glycol adipic acid polyester with the OH-value 52 (corresponding to 1.58 per cent OH) and of the acid value 1 are caused to react as described above with 200 parts of 1.5-naphthylene diisocyanate at 130° C. while stirring and, after the rise of temperature is completed, 48 parts of finely powdered quinite are stirred into the mix at 135° C. After repeatedly stirring the mix is cast into molds and after-heated at 100° C. for 6 hours. The rubber-like material thus obtained exhibits the following mechanical properties:

| | | |
|---|---|---|
| Tensile strength | kg./cm.$^2$ | 381 |
| Elongation at break | per cent | 625 |
| Permanent set | do | 12 |
| Tear resistance | kg./cm.$^2$ | 96 |
| Load at 300% elongation | | 86 |
| Hardness | | 81 |
| Resiliency | | 39 |

If 1000 parts of the dried glycol adipic acid polyester are caused to react in the same way as described above with 248 parts of 1.5-naphthylene diisocyanate and 74 parts of quinite (1.4-dihydroxycyclohexane) a material with the following mechanical properties is obtained:

| | | |
|---|---|---|
| Tensile strength | kg./cm.$^2$ | 228 |
| Elongation at break | per cent | 440 |
| Permanent set | do | 18 |
| Tear resistance | kg./cm.$^2$ | 96 |
| Load at 300% elongation | | 133 |
| Hardness | | 88 |
| Resiliency | | 38 |

If 300 parts of 1.5-naphthylene diisocyanate and 100 parts of quinite are caused to react with the above glycol adipic acid polyester a material with the following properties is obtained:

| | | |
|---|---|---|
| Tensile strength | kg./cm.$^2$ | 234 |
| Elongation at break | per cent | 370 |
| Permanent set | do | 11 |
| Tear resistance | kg./cm.$^2$ | 83 |
| Load at 300% elongation | | 130 |
| Hardness | | 84 |
| Resiliency | | 28 |

Example 10

200 parts of hexanediol-adipic acid polyester having an OH-content of 1.55 per cent are dehydrated as usual and caused to react at 130° C. with 32 parts of 1.5-naphthylene-diisocyanate, reaction starting immediately and temperature being raised thereby to 138–140° C. After completion of reaction and at a temperature of 135° C., 5 parts of hexanediol are added to the mix which is then cast into the mold. By afterheating for 10 hours a rubber-like material is obtained which exhibits the following properties:

Tensile strength _____ kg./cm.$^2$__ 248
Elongation at break _____ per cent__ 600
Load at 300% elongation _____ 110
Tear resistance _____ kg./cm.$^2$__ 121
Hardness _____ 86
Resiliency _____ 57

*Example 11*

A stirring vessel which is connected with a vacuum pipe line is charged with 750 parts of ethylene-glycol-adipic acid polyester having an OH-content of 1.65 per cent and a COOH-content of 0.10 per cent and 35 parts of carbon black. The mix is evacuated at 130° C. for 15 minutes. Thereafter, 20 parts of butadiene sulphone and 26 parts of paraffin are added. It is stirred at normal pressure at 140° C. and then the vessel is evacuated for 30 minutes. Now the mix is caused to react with 165 parts of naphthylene-1.5-diisocyanate, temperature is decreased to 115° C. and chain-lengthening and cross-linking is carried out with 25 parts of molten quinite. After 15–25 mintues viscosity suddenly increases, the stirrer being blocked thereby. The non-sticking material which is easily moldable in the heat is removed from the vessel, coldly rolled and extruded into bicycle tubes at 50–100° C. The material is distinguished by an especially low permeability to gas which is essentially lower than in the case of natural rubber or synthetic rubber-like materials on the basis of butadiene. Tear resistance of tubes thus prepared is so good that the hole for introducing the valve need not be reinforced in any way. The roughened tube ends are welded by a solution of natural rubber or of synthetic rubber-like materials to which, before application, some p.p'.p''-triphenylmethane-tri-isocyanate has been added; welding can also be performed by means of the uncured material itself prepared as described above. In the latter case the mix which, preferably is diluted with a solvent is immediately applied as welding agent after the addition of quinite.

The tubes thus prepared exhibit the following properties:

Tensile strength _____ kg./cm.$^2$__ 420
Elongation at break _____ percent__ 600
Permanent set _____ do____ 10
Tear resistance _____ kg./cm.$^2$__ 35

*Example 12*

The mix of glycol adipic acid polyester, propylene glycol adipic acid polyester and carbon black prepared as described in Example 11 is homogenized on the roller and, after putting it into an open vessel, a stream of air is bubbled therethrough at 140° C. for 1–1½ hours. 165 parts of naphthylene-1.5-diisocyanate are then added, heating is stopped and the isocyanate polyester is cooled down to 115° C., and 25 parts of esterified montan wax and 20 parts of butanediol-1.4 are added while vigorously stirring. The reaction mix is cast upon waxed and well dried plates which are put into a drying chamber of a temperature of 115° C. Condensation is carried through until the desired degree of plasticity is achieved. After 30–60 minutes the plastic material can be removed from the plates. The material is then cut into strips and without rolling extruded into a water hose by means of a heated extruding machine. The product thus extruded is stored at room temperature for 48 hours and then after-heated at 100° C. for 12 hours, the properties obtained being the following:

Tensile strength _____ kg./cm.$^2$__ 310
Elongation at break _____ percent__ 590
Tear resistance _____ kg./cm.$^2$__ 29

Fabric lining which is usually required for water hoses can be dispensed with owing to the high tensile strength and resistance to aging of the products prepared as described above. The condensate may easily be extruded into threads. Such threads are first stored at room temperature for 24 hours and then after-heated at 100° C. A single thread exhibits a tensile strength of 5 kg./mm.$^2$ and an elongation at break of 600%.

*Example 13*

1000 parts of propylene glycol adipic acid polyester having an OH content of 1.5 per cent and a COOH content of 0.15 per cent are homogenized in the grinding mill and evacuated in a vessel at 130° C. and 12 mm. pressure for 30 minutes. 10 parts of paraffin and 0.2 part by volume of concentrated hydrochloric acid are added and the whole is evacuated once more for 20 minutes. Now the mix is caused to react with 164 parts of naphthylene-1.5-diisocyanate and then cooled down to 110° C. Thereafter a mixture of 18 parts by volume of butanediol-1.4 and 2.5 parts of glycerine-α-phenyl-ether is stirred into the mix. After 45 minutes the material is removed from the vessel and, on a cold roller, 10 parts of esterified lower fatty acids from paraffin oxidation are added to the mix which is then extruded by means of a heated extruding machine. The properties of the material thus condensed are as follows:

Tensile strength _____ kg./cm.$^2$__ 210
Elongation at break _____ percent__ 560
Tear resistance _____ kg./cm.$^2$__ 17

*Example 14*

500 parts of propylene glycol adipic acid polyester of an OH content of 1.25% and a COOH content of 0.12% and 500 parts of ethylene glycol adipic acid polyester having an OH content of 1.62% and a COOH content of 0.10% are evacuated while stirring at 130° C. for 20 minutes by means of a water-beam pump. 0.13 part by volume of concentrated hydrochloride acid is added and the mix is again evacuated for 30 minutes. Now the mixed polyester is caused to react with 160 parts of naphthylene-1.5-diisocyanate for 7 minutes and the mix is evacuated once more.

The batch is divided into 2 equal portions. 12.5 parts of quinite are stirred into one portion (580 parts) and the mix is cast upon a plate previously heated up to 100° C. and, for securing an easy removal of the material, provided with a protective coating of paraffin or of an aqueous solution of the condensation product from fatty acid chloride and methyl taurine. After one hour the bubble-free sheet thus obtained is removed from the plate and after-heated at 100° C. for 3 hours. The remaining portion of the above mix is dissolved with 200–4500 parts by volume of a well dried organic solvent, such as methylene chloride, benzene or acetic acid ester. For curing 10 parts of butane diol are stirred into the solution. It can be used for preparing dipped articles or worked by means of an extruding pistol. After 24 hours the products thus prepared are after-heated at 100° C. for 1–4 hours, the properties obtained being the following:

Tensile strength _____ kg./cm.$^2$__ 320
Elongation at break _____ percent__ 650
Tear resistance _____ kg./cm.$^2$__ 27

*Example 15*

A bicycle tire of 1200 grams prepared by means of the centrifugal casting process in accordance with Example 5 which has become useless on account of a punch or a crack is reclaimed and made into a sheet by passing it through a pair of cold friction rollers at a narrow and, later on, a wider space. The sheet is divided into 2 equal portions.

To one portion there are added on the roller 60 grams of an ethylene glycol phthalic acid polyester with the OH-value 30 and the acid value 5. Under a pressure of 30 kg./cm.² and at a temperature of 150° C. for 15 minutes this mix is made into heels which as to durability and gliding properties are superior to other material, such as leather or rubber. The second portion of the sheet is directly worked up without additional compounds. Heels made thereof also exhibit very good gliding properties and have a good durability, its surface properties being, however, somewhat impaired.

*Example 16*

Scrap of the reaction product of a linear propylene glycol adipic acid polyester with 1.5-napthylene diisocyanate+hexahydropyrocatechin containing 5 per cent by weight of carbon black are thoroughly mixed on the roller with 10 per cent of an uncompletely cured condensation product consisting of the same ingredients and having been stored for some days. This mix is made into a sheet on the roller. Pressing into plain 4 mm. thick plates is performed at 150° C. for 10 minutes and under a pressure of 30 kg./cm.²·

The mechanical properties of the products thus reclaimed exhibit the following figures:

| | |
|---|---|
| Tensile strength _____kg./cm.²__ | 183 |
| Elongation at break _____per cent__ | 700 |
| Load at 300% elongation _____ | 46 |
| Permanent set _____per cent__ | 21 |
| Resiliency: | |
|     At 20° C. _____ | 50 |
|     At 70° C. _____ | 60 |
| Hardness _____ | 60 |
| Tear resistance _____kg./cm.²__ | 83 |

Plates thus prepared, which may be provided with a profile, are extremely suitable as floor covering material which is exposed to high stresses, for instance, in railway-cars, street-cars, etc.

*Example 17*

Scrap of the reaction product of propylene glycol adipic acid polyester is substituted by scrap of ethylene glycol adipic acid polyester or of a mixed ester of adipic acid with ethylene glycol and 1.2-propylene glycol or of mixes of ethylene glycol adipic acid polyester with 1.2-propylene glycol adipic acid polyester and is treated for reclaiming as described in Examples 15 and 16.

Scrap of the kind as described in Example 15 and Example 16 can also be converted into moldable sheets after mixing same with very finely crushed and ground scrap of such rubber-like material of the polyester series as are cured with water or hydrogen sulphide instead of with bifunctional organic compounds.

The following products are mentioned which can be obtained in accordance with the above process: boot soles, leather substitute, packing rings, rubber buffers, etc.

*Example 18*

Scrap of the reaction product from linear ethylene glycol polyester and 1.5-naphthylene diisocyanate which have been cured with a glycol is ground and heated in an autoclave under steam pressure (4–15 atmospheres excess pressure) for 30–90 minutes, a strongly adhesive material being obtained after drying which can be made into a sheet on the roller. By further incorporating therewith 5–10 parts of naphthylene diisocyanate and 1–2 parts of a glycol (calculated on 100 parts of the reaction product) and on press molding into, for instance, 4 mm. thick plates (30'/130° C. at 50 kg./cm.²) products are obtained which exhibit the following properties:

| | |
|---|---|
| Tensile strength _____kg./cm.²__ | 300 |
| Elongation at break _____per cent__ | 600 |
| Load at 300/ elongation _____ | 80 |
| Permanent set _____per cent__ | 25 |
| Resiliency _____ | 60 |
| Hardness _____ | 72 |

*Example 19*

200 parts of a glycol adipic acid polyester (carefully dehydrated at 100° C. and 12 mm. pressure) of the OH-value 60 are caused to react with 38 parts of 1.5-naphthylene-diisocyanate at 130° C. After completion of reaction 12.4 parts of a compound of the following formula

HO—(CH₂)₆—OOC—(CH₂)₄—COO—(CH₂)₆—OH are stirred into the mixture at 130 to 135° C. After repeatedly stirring the mixture is cast into molds and heated at 100° C. for a further 20 hours. The rubber-like material thus obtained has the following properties:

| | |
|---|---|
| Tensile strength _____kg./cm.²__ | 220 |
| Elongation at break _____per cent__ | 600 |
| Permanent set _____do____ | 21 |
| Tear resistance _____kg./cm.²__ | 98 |
| Load at 300% elongation _____ | 25 |
| Hardness _____ | 68 |
| Resiliency _____ | 70 |

*Example 20*

200 parts of a glycol adipic acid polyester of the OH-value 58 are dehydrated at 130° C. and 12 mm. pressure and are caused to react with 38 parts of 1.5-naphthylene-diisocyanate while stirring; after the rise of temperature (138 to 140° C.) is completed 20.4 parts of a glycol phthalic acid ester (OH-value 242) are stirred into the mixture at 130° C. After repeatedly stirring the mixture is cast into molds and heated at 100° C. for a further 20 hours. A rubber-like material is obtained.

*Example 21*

200 parts of a glycol adipic acid polyester carefully dehydraed (at 130° C. and 12 mm. pressure), having the OH-number 60, are caused to react at 130° C. with 38 parts of 1.5-naphthylene diisocyanate. After completion of reaction 19.4 parts of a compound of the following formula

HO—(CH₂)₆—OOC.(CH₂)₃—SO₂—
                              (CH₂)₃—COO.(CH₂)₆—OH are added to the mixture at 130 to 135° C. After repeatedly stirring the mixture is cast into molds and heated at 100° C. for a further 20 hours. A rubber-like material is obtained.

*Example 22*

200 parts of a glycol adipic acid polyester carefully dehydrated (at 130° C. and 12 mm. pressure), of the OH-value 60 are caused to react with 38 parts of 1.5-naphthylene diisocyanate. After completion of reaction 12.8 parts of a compound of the following formula:

HO—(CH₂)₄NH.CO.(CH₂)₄.CONH(CH₂)₄—OH are added to the mixture at 130 to 135° C. After repeatedly stirring the mixture is cast into molds and heated at 100° C. for a further 20 hours. The porous material thus obtained shows a good resiliency.

*Example 23*

200 parts of a glycol adipic acid polyester carefully dehydrated (at 130° C. and 12 mm. pressure), of the OH-value 60 are caused to react with 38 parts of 1.5-naphthylene diisocyanate. After completion of reaction 10.4 parts of a compound of the following formula

HO—CH₂.CH₂.COO.NH—
                      CH₂.CH₂NHCOO.CH₂—CH₂—OH are added to the mixture at 130 to 135° C. After repeatedly stirring the mixture is cast into molds and heated at 100° C. for a further 20 hours. The material thus obtained has the following properties:

| | |
|---|---|
| Tensile strength kg./cm.² | 195 |
| Elongation at break per cent | 545 |
| Permanent set do | 9 |
| Tear resistance kg./cm.² | 98 |
| Load at 300% elongation | 25 |
| Hardness | 68 |
| Resiliency | 70 |

*Example 24*

200 grams of a glycol adipic acid polyester of the hydroxyl number 53 and the acid number 1 are dehydrated in vacuum at 120 to 130° C. and 28 grams of p-phenylene diisocyanate are added thereto with stirring. The temperature rises to about 138° C. After completion of the reaction 4 grams of 1,4-butylene glycol are added at 130° C. and the melt is cast into molds. The mold is further heated at 100° C. and the material is removed after ½ hour. By heating for another 10 hours the molding represents a highly elastic material which exhibits the following properties:

| | |
|---|---|
| Tensile strength kg./cm.² | 372 |
| Elongation at break per cent | 855 |
| Permanent set do | 15 |
| Tear resistance kg./cm.² | 135 |
| Load at 300% elongation | 54 |
| Hardness | 66/64 |
| Resiliency | 68/70 |

We claim:

1. The process which comprises reacting an anhydrous organic, linear polyester having from 0.6 to 2.4 per cent by weight of hydroxyl groups and an acid value substantially not exceeding 1, said polyester being made from an aliphatic polymethylene dicarboxylic acid and a polymethylene glycol, with an organic diisocyanate whose sole reactive groups are isocyanate groups, in an excess of from 20 to 250 per cent over the amount which is necessary to combine with said hydroxyl groups and then reacting the isocyanate modified polyester thus formed with a compound of the general formula R(OH)$_2$ having a molecular weight not exceeding 800, wherein R is a radical selected from the group consisting of a divalent hydrocarbon radical and a divalent radical in which the carbon chain is interrupted by a member of the group consisting of —O—, —N—, —S—, —SO$_2$ in such a proportion, that the excess of isocyanate groups therein is reduced to at most zero.

2. The process which comprises reacting an anhydrous, organic, linear polyester having from 0.6 to 2.4 per cent by weight of hydroxyl groups and an acid value not substantially exceeding 1.0, said polyester being made from an aliphatic polymethylene dicarboxylic acid and a polymethylene glycol, with an organic diisocyanate whose sole reactive groups are isocyanate groups, in an excess of from 20 to 250 per cent over the amount which is necessary to combine with said hydroxyl groups, and then reacting the isocyanate modified polyester thus formed with a glycol of the general formula: R(OH)$_2$ having a molecular weight not exceeding 800, wherein R stands for a divalent hydrocarbon radical in such a proportion that the excess of isocyanate groups is reduced to at most zero.

3. The process which comprises reacting an anhydrous, organic, linear polyester having from 0.6 to 2.4 per cent by weight of hydroxyl groups and an acid value not substantially exceeding 1.0, said polyester being made from an aliphatic polymethylene dicarboxylic acid and a polymethylene glycol, with an organic diisocyanate whose sole reactive groups are isocyanate groups, in an excess of from 20 to 250 per cent over the amount which is necessary to combine with said hydroxyl groups, and then reacting the isocyanate modified polyester thus formed with a polymethylene glycol having a molecular weight not exceeding 800 in such a proportion that the excess of isocyanate groups therein is reduced to at most zero.

4. A process as claimed in claim 1, wherein the organic diisocyanate is an aromatic polycyclic diisocyanate.

5. A process as claimed in claim 1, wherein a substantial part of the reaction between the isocyanate modified polyester and the polymethylene glycol is carried out while molding the reaction mixture.

6. A process as claimed in claim 1, wherein the reaction between the linear polyester and the organic diisocyanate is carried out in the presence of an acid reacting agent.

7. A process as claimed in claim 1, wherein the reaction between the linear polyester and the organic diisocyanate is carried out in the presence of an alkaline reacting agent.

8. A process as claimed in claim 1, wherein the reaction between the isocyanate modified polyester and the polymethylene glycol is carried out in the presence of a tertiary amine.

9. A process which comprises reacting an anhydrous, organic, linear polyester having from 1.2 to 1.8 per cent by weight of hydroxyl groups and an acid value not substantially exceeding 1.0, said polyester being made from an aliphatic polymethylene dicarboxylic acid and a polymethylene glycol, with an aromatic polycyclic diisocyanate in an excess of from 50 to 100 per cent over the amount which is necessary to combine with said hydroxyl groups, and then reacting the isocyanate modified polyester thus formed with a compound of the general formula R(OH)$_2$ having a molecular weight not exceeding 800, wherein R is a radical selected from the group consisting of a divalent hydrocarbon radical and a divalent radical in which the carbon chain is interrupted by a member of the group consisting of —O—, —N—, —S—, —SO$_2$ in such a proportion that the excess of isocyanate groups therein is reduced to at most zero, a substantial part of the latter reaction being carried out while molding the reaction mixture.

10. A process which comprises reacting an anhydrous, organic, linear polyester having from 1.2 to 1.8 per cent by weight of hydroxyl groups and an acid value not substantially exceeding 1.0, said polyester being being made from an aliphatic polymethylene dicarboxylic acid and a polymethylene glycol, with an aromatic polycyclic diisocyanate in an excess of from 50 to 100 per cent over the amount which is necessary to combine with said hydroxyl groups, and then reacting the isocyanate modified polyester thus formed with a glycol of the general formula R(OH)$_2$ having a molecular weight not exceeding 800, wherein R stands for a divalent hydrocarbon radical in such a proportion that the excess of isocyanate groups therein is reduced to at most zero, a substantial part of the latter reaction being carried out while molding the reaction mixture.

11. A process which comprises reacting an anhydrous, organic, linear polyester having from 1.2 to 1.8 per cent by weight of hydroxyl groups and an acid value not substantially exceeding 1.0, said polyester being made from an aliphatic polymethylene dicarboxylic acid and a polymethylene glycol, with an aromatic polycyclic diisocyanate in an excess of from 50 to 100 per cent over the amount which is necessary to combine with said hydroxyl groups, and then reacting the isocyanate modified polyester thus formed with a polymethylene glycol having a molecular weight not exceeding 800 in such a proportion that the excess of isocyanate groups therein is reduced to at most zero, a substantial part of the latter reaction being carried out while molding the reaction mixture.

12. A process as claimed in claim 9, wherein the organic diisocyanate is naphthalene-1,5-diisocyanate.

13. A process as claimed in claim 9, wherein the compound of the general formula R(OH)₂ employed in the final step is quinite.

14. A process as claimed in claim 9, wherein the compound of the general formula R(OH)₂ employed in the final step is 1.4-butylene glycol.

15. A process as claimed in claim 9, wherein the reaction between the linear polyester and the organic diisocyanate is carried out in the presence of an acid reacting agent, and the reaction between the isocyanate modified polyester thus formed and the compound of the general formula R(OH)₂ is carried out in the presence of a tertiary amine.

16. A process as claimed in claim 9, wherein the reaction between the linear polyester and the organic diisocyanate is carried out in the presence of an alkaline reacting agent, and the reaction between the isocyanate modified polyester thus formed and the compound of the general formula R(OH)₂ is carried out in the presence of a tertiary amine.

17. A product obtained by the process as claimed in claim 1.

18. A molded product obtained by the process as claimed in claim 9.

References Cited in the file of this patent
UNITED STATES PATENTS

| | | |
|---|---|---|
| 2,620,516 | Muller | Dec. 9, 1952 |
| 2,621,166 | Schmidt et al. | Dec. 9, 1952 |